(12) United States Patent
Li et al.

(10) Patent No.: US 7,653,627 B2
(45) Date of Patent: Jan. 26, 2010

(54) SYSTEM AND METHOD FOR UTILIZING THE CONTENT OF AN ONLINE CONVERSATION TO SELECT ADVERTISING CONTENT AND/OR OTHER RELEVANT INFORMATION FOR DISPLAY

(75) Inventors: Ying Li, Bellevue, WA (US); Li Li, Issaquah, WA (US); Tarek Najm, Kirkland, WA (US); Xianfang Wang, Beijing (CN); Hongbin Gao, Beijing (CN); Hua-Jun Zeng, Beijing (CN); Benyu Zhang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 11/128,788

(22) Filed: May 13, 2005

(65) Prior Publication Data

US 2006/0259473 A1 Nov. 16, 2006

(51) Int. Cl.
*G06F 17/30* (2006.01)
(52) U.S. Cl. ......................................................... 707/7
(58) Field of Classification Search ....................... None
See application file for complete search history.

(56) References Cited

U.S. PATENT DOCUMENTS

| | | | | |
|---|---|---|---|---|
| 5,828,839 A | * | 10/1998 | Moncreiff | 709/204 |
| 6,606,644 B1 | * | 8/2003 | Ford et al. | 709/203 |
| 6,714,791 B2 | * | 3/2004 | Friedman | 455/456.1 |
| 6,993,535 B2 | * | 1/2006 | Bolle et al. | 707/104.1 |
| 7,007,008 B2 | * | 2/2006 | Goel et al. | 707/3 |
| 7,092,821 B2 | * | 8/2006 | Mizrahi et al. | 702/1 |
| 7,136,875 B2 | * | 11/2006 | Anderson et al. | 707/104.1 |
| 7,143,054 B2 | * | 11/2006 | Doherty | 705/10 |
| 7,236,969 B1 | * | 6/2007 | Skillen et al. | 707/3 |
| 2003/0126136 A1 | * | 7/2003 | Omoigui | 707/10 |
| 2005/0171955 A1 | * | 8/2005 | Hull et al. | 707/10 |

OTHER PUBLICATIONS

Walker, L. "Gmail Leads Way in Making Ads Relevant" Washington Post. May 13, 2004. Available online at http://www.washingtonpost.com/ac2/wp-dyn/A20596-2004May12?language=printer.*
O'Reilly, T. "The Fuss About Gmail and Privacy: Nine Reasons Why It's Bogus" The O'Reilly Network. Apr. 16, 2004. Available online at http://www.oreilly.com/Ipt/wlg/4707.*

(Continued)

*Primary Examiner*—Neveen Abel Jalil
*Assistant Examiner*—Mark Andrew X Radtke
(74) *Attorney, Agent, or Firm*—Shook, Hardy & Bacon L.L.P.

(57) ABSTRACT

Systems and methods for analyzing the content of online conversations using data mining technologies are provided. Methods and systems for utilizing the results of data mining technology implementation to retrieve relevant advertising content and/or other relevant information for display in association with the content of an online conversation are also provided.

12 Claims, 6 Drawing Sheets

OTHER PUBLICATIONS

Hansell, S. "The Internet Ad You Are About to See Has Already Read Your E-Mail" New York Times. Jun. 21, 2004. Available online at http://www.nytimes.com/2004/06/21/technology/21google.html.*

Monika Henzinger, Bay-Wei Chang, Brian Milch, and Sergey Brin, article entitled Query-Free News Search, California, USA.

Peng Yu, and Frank Seide, article entitled A Hybrid Word/Phoneme-Based Approach for Improved Vocabulary-Independent Search in Spontaneous Speech, Beijing, China.

Frank Seide, Peng Yu, Chengyuan Ma, and Eric Chang, article entitled Vocabulary-Independent Search in Spontaneous Speech, Beijing, China.

* cited by examiner

SYSTEM AND METHOD FOR UTILIZING THE CONTENT OF AN ONLINE CONVERSATION TO SELECT ADVERTISING CONTENT AND/OR OTHER RELEVANT INFORMATION FOR DISPLAY

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to systems and methods for analyzing the content of online conversations (e.g., instant messaging sessions) using data mining technologies. Additionally, embodiments of the present invention relate to utilizing the results of data mining technology implementation to retrieve relevant advertising content and/or other relevant information (e.g., dictionary definitions, links to additional information, and the like) for display.

BACKGROUND OF THE INVENTION

Increasing numbers of individuals are utilizing online conversation tools, e.g., instant messaging, to facilitate communications with family, friends, and colleagues. Oftentimes, displayed in association with the content of an online conversation, is one or more advertisements. However, as the displayed advertisements are not generally relevant to the user, these advertisements are seldom noticed and even when noticed are frequently disregarded.

Additionally, the topic of online conversations oftentimes takes the form of an inquiry regarding a particular topic or product a user may be interested in. Even though the content of the online conversation indicates that the user has a particular interest in a specific topic, in order to retrieve information related to the topic, the user must access a general search engine outside of the online conversation window and attempt to locate relevant information from a generally extensive list of resources.

Accordingly, a method for utilizing the content of an online conversation to dynamically select contextual or relevant advertising content for display would be desirable. Additionally, a method for utilizing the content of an online conversation to dynamically select other relevant information (e.g., dictionary definitions, links to additional information and the like) for display would be advantageous.

BRIEF SUMMARY OF THE INVENTION

Embodiments of the present invention provide methods for utilizing the content of online conversations (e.g., instant messaging sessions) to select advertising content for display. In one embodiment, the method may include receiving the content of an online conversation, extracting one or more keywords from the content of the online conversation, and selecting the advertising content for display based upon the one or more extracted keywords. If desired, the method may further include displaying the advertising content selected in association with the online conversation.

In another embodiment, the method may include scoring the one or more extracted keywords, identifying any user intention keywords among the one or more scored keywords and, if any user intention keywords are identified, re-weighting the one or more scored keywords in accordance with the user intention keywords identified.

In yet another embodiment, the method may include scoring the one or more extracted keywords, determining whether a topic change has occurred and, if it is determined that a topic change has occurred, re-weighting the one or more scored keywords based upon historical data.

Embodiments of the present invention further provide methods for utilizing the content of online conversations (e.g., instant messaging sessions) to select relevant information (e.g.,) dictionary definitions, links to additional information, and the like) for display. In one embodiment, the method may include receiving the content of an online conversation, extracting one or more keywords from the content of the online conversation, and selecting relevant information for display based upon the one or more extracted keywords. If desired, the method may further include displaying the relevant information selected in association with the content of the online conversation.

In another embodiment, the method may include scoring the one or more extracted keywords, identifying any user intention keywords among the one or more scored keywords and, if any user intention keywords are identified, re-weighting the one or more scored keywords in accordance with the user intention keywords identified.

In yet another embodiment, the method may include scoring the one or more extracted keywords, determining whether a topic change has occurred and, if it is determined that a topic change has occurred, re-weighting the one or more scored keywords based upon historical data.

Additional embodiments of the present invention provide computer-readable media having computer-executable instructions for performing a method. In one embodiment, the method may include receiving the content of an online conversation (e.g., an instant messaging session), extracting one or more keywords from the content of the online conversation, and retrieving at least one of advertising content and other relevant information for display based upon the one or more extracted keywords.

Computers programmed to perform the methods disclosed herein are also provided.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for analyzing the content of online conversations (e.g., instant messaging sessions) using data mining technologies. Embodiments of the present invention further provide methods and systems for utilizing the results of data mining technology implementation to retrieve relevant advertising content and/or other information for display.

Thus, embodiments of the present invention provide systems and methods for selecting relevant advertising content and/or other relevant information for display in association with the text of an online conversation based upon automatic analysis of the content of the online conversations and the content of an advertisement, which content may be described by keywords or ad-words, and/or the content of other relevant information, which content may be described by keywords or the like.

The systems and methods described herein are fully automated and facilitate selection of contextual advertising content and/or other relevant information in response to specific topics that are relevant to the content of a user's online conversation. Keywords are extracted from the text of an online conversation using data mining technologies. The extracted keywords represent topics that are an approximation of the user's interest(s) at the time the online conversation is occurring. Subsequently, utilizing the extracted keywords, relevant advertisements and/or other information are retrieved for the current user and displayed in association with the content of the online conversation. If desired, advertising content and/or other relevant information retrieval may also take into account other factors such as click-through probabilities, monetization values for the keywords, user profiles, and/or information regarding user behaviors.

Utilizing the systems and methods described herein, advertising content displayed in association with the content of an online conversation is more likely to be relevant to the user, thus increasing the probability that the user will select the advertising content thereby accessing further information related thereto. Such access increases the probability that the user will complete a purchase of the advertised item and thus maximizes advertiser revenue. Further, displaying other relevant information in association with the content of an online conversation enhances the user's online experience and makes him or her more likely to utilize the online service in the future. Still further, if available, user-profile and behavior information may be utilized in selecting content, further tuning advertising content and other relevant information towards a user's interests.

Having briefly described an overview of the present invention, an exemplary operating environment for the present invention is described below.

Figure 1:
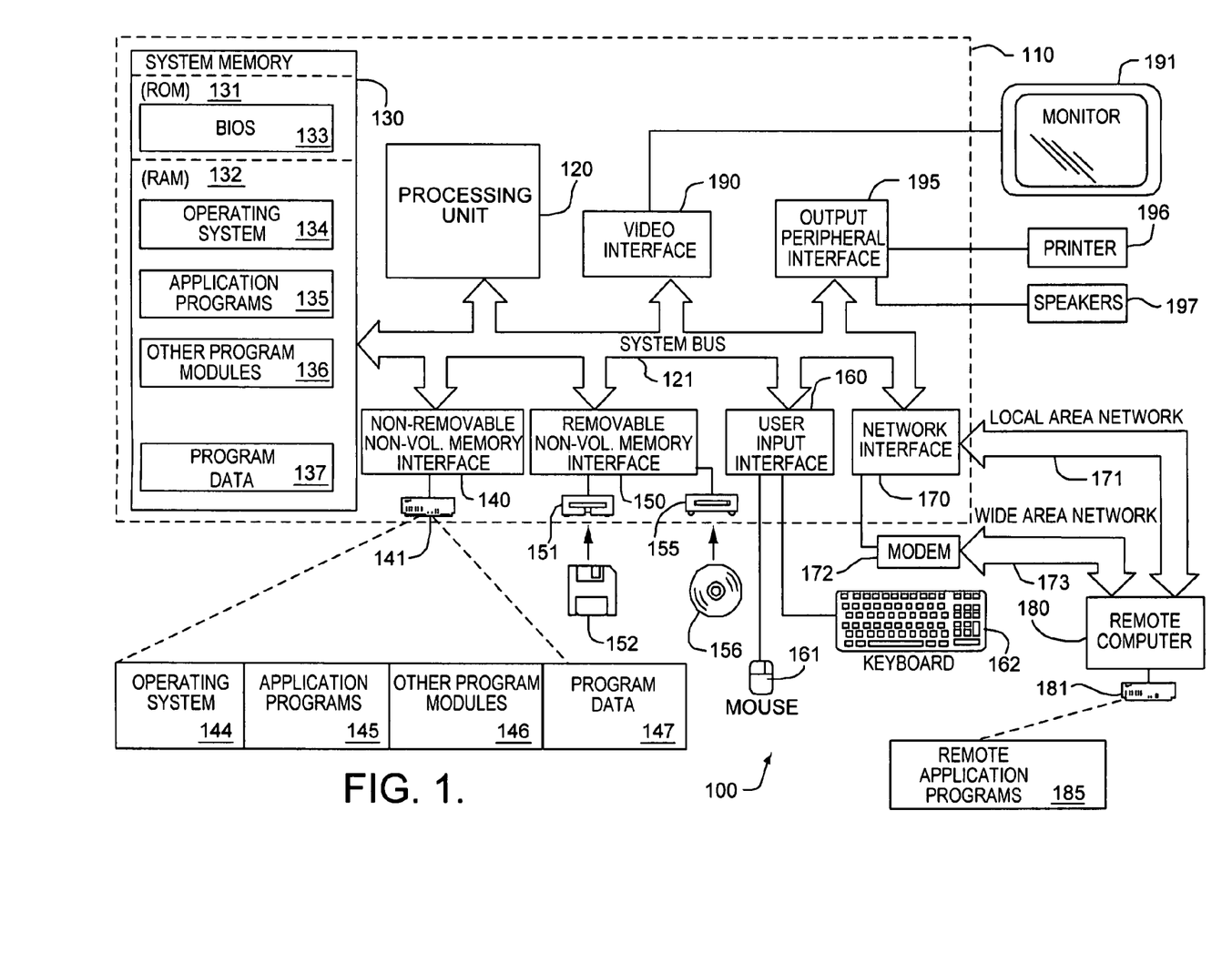
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
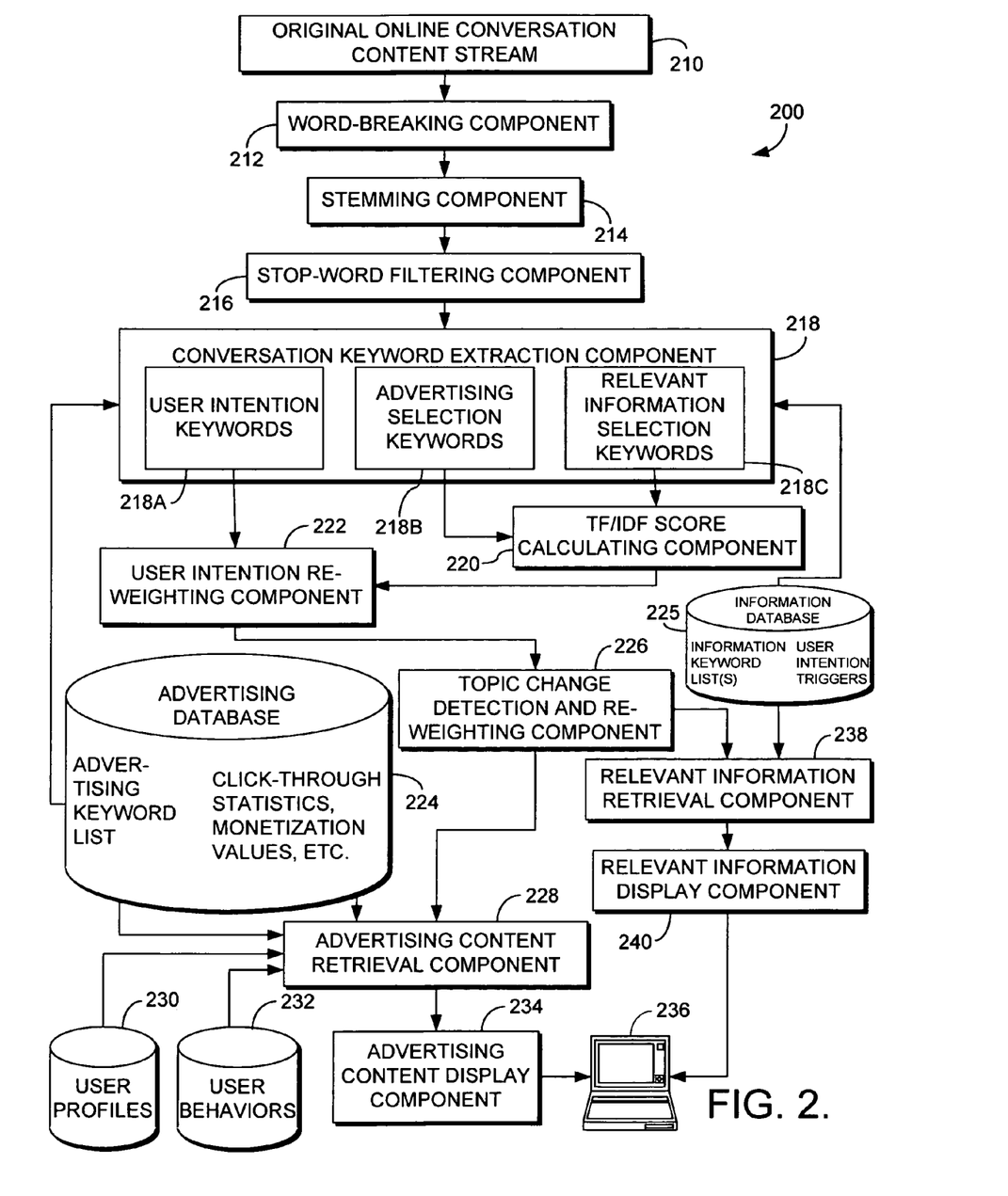
FIG. 2 is a schematic diagram of an exemplary system architecture in accordance with an embodiment of the present invention.

As previously mentioned, embodiments of the present invention relate to systems and methods for analyzing the content of online conversations (e.g., instant messaging sessions) using data mining technologies and utilizing the results of such analysis to retrieve relevant advertising content and/or other relevant information for display. Turning to FIG. 2, a block diagram is illustrated which shows an overall system architecture for online conversation content analysis and retrieval of advertising content and/or other relevant information in accordance with an embodiment of the present invention, the overall system architecture being designated generally as reference numeral 200.

The system 200 includes a word-breaking component 212 for detecting breaks between words and utilizing those breaks to define a word sequence upon receipt of an original online conversation content stream 210 (e.g., the content of an instant messaging session). The word-breaking component 212 may be particularly useful in languages having a format that provides less structured word breaks than the English language. The system 200 further includes a stemming component 214 for standardizing the words of the word sequence, that is, for stemming the words down to their respective root words. Additionally, the system 200 includes a stop-word filtering component 216 for identifying and filtering out stop words, that is, words that are unimportant to the topic of the on-line conversation, from the word sequence. In general, stop words are words that are, for instance, too commonly utilized in conversation to reliably indicate a user's interest in any particular topic. Stop words are typically provided by way of a pre-defined list and are identified by comparison of the stemmed word sequence with the pre-defined list.

The system 200 further includes a conversation keyword extraction component 218 for extracting keywords from the original online conversation and comparing the extracted keywords to a plurality of lists to determine matches. Thus, the conversation keyword extraction component 218 receives input from an advertising database 224 wherein an advertising keyword list(s) for comparison to the extracted keywords may be stored, an information database 225 wherein an information keyword list(s) and a list of user intention triggers for comparison to the extracted keywords may be stored, as well as the output from the stop-word filtering component 216.

The conversation keyword extraction component 218 further categorizes the extracted keywords into one or more of three categories: user intention keywords 218A, advertising selection keywords 218B, and relevant information selection keywords 218C. User intention keywords 218A are keywords that identify a user's particular interest in a specific topic and typically follow a pre-defined trigger word or phrase. For instance, if a user inputs the phrase "I'd like to buy a jaguar", the word "jaguar" may be characterized as a user intention keyword as it follows the phrase "I'd like to buy". Words or phrases which trigger user intention keywords 218A are typically provided by way of a pre-defined list and the user intention keywords 218A are then identified by comparison of the word sequence input from the stop-word filtering component 216 of the system 200 with the pre-defined list. The list of user intention triggers may be stored in information database 225 as shown, or may be stored in a separate database, if desired.

User intention keywords 218A may also be determined based upon user profile information 230 and/or user behavior information 232, if this information is available. For instance, if in a large percentage of online conversations the user has had in the past thirty days, he/she has mentioned the word "jaguar", this word may be characterized as a user intention keyword. User intention keywords 218A are intended to identify a list of words in which a user appears to have more than an idle conversational interest.

Advertising selection keywords 218B are keywords that, when compared to one or more advertising keyword lists stored in the advertising database 224, may be matched with a word on the list(s). Note that a particular keyword may be both a user intention keyword 218A and an advertising selection keyword 218B.

Relevant information selection keywords 218C are keywords that, when compared to one or more information keyword lists stored in the information database 225, may be matched with a word on the list(s). Note that a particular keyword may be a user intention keyword 218A and a relevant information selection keyword 218C, may be an advertising selection keyword 218B and a relevant information selection keyword 218C, or may be a user intention keyword 218A, an advertising selection keyword 218B, and a relevant information selection keyword 218C. Typically, keywords extracted in the conversation keyword extraction component 218 will be categorized in more than one of these categories. More particularly, user intention keywords 218A will typically also be categorized as at least one of an advertising selection keyword 218B and a relevant information selection keyword 218C.

Still further, the system 200 includes a term frequency and inverse document frequency (TF/IDF) score calculating component 220 for calculating the TF/IDF values of the advertising selection keywords 218B and/or relevant information selection keywords 218C extracted from the conversation keyword extraction component 218. This value may subsequently be used to score the keywords relative to one another such that those with the highest scores may be used when retrieving relevant advertising content and/or other relevant information, as more fully described below. (As will be understood by those of ordinary skill in the art, TF/IDF is the standard technique used in text information retrieval for ranking documents by relevance.)

Additionally, the system 200 includes a user intention re-weighting component 222. As user intention keywords 218A are keywords in which a user appears to have a greater interest than other keywords he or she may be using in idle conversation, user intention keywords 218A are given greater weight in determining upon which words advertising content and/or useful information will be selected for display, as more fully described below. The user intention re-weighting component 222 compares the list of user intention keywords 218A extracted from the conversation keyword extraction component 218 to the scored advertising selection and relevant information selection keywords input from the TF/IDF score calculating component 222 and provides additional weight to those keywords appearing as both user intention keywords 218A and advertising selection keywords 218B and to those keywords appearing as both user intention keywords 218A and relevant information selection keywords 218C. In one embodiment, the user intention keywords 218A are weighted to a value greater than 1.0.

Still further, the system 200 includes a topic change detection and re-weighting component 226 for re-weighting the extracted keywords based upon detected changes in topic. The purpose of the topic change detection and re-weighting component 226 is to accommodate for the fact that the original online conversation content stream 210 may contain multiple topics.

The system 200 additionally contains an advertising content retrieval component 228 for retrieving advertising content (i.e., one or more advertisements) that is associated with the advertising keywords having the closest match (or matches) to the extracted and weighted advertising selection keywords. The advertising content retrieval component 228 receives input from the advertising database 224 (in the form of an advertising keyword list and/or click-through statistics, monetization values and the like), user profiles 230 and/or information regarding user behaviors 232, if available, and the output from the topic change detection and re-weighting component 226.

The system 200 additionally includes an advertising content display component 234 which displays the advertising content retrieved from the advertising content retrieval component 228 in association with the original online conversation content stream 210 on an appropriate viewing device 236, e.g., a conventional computer monitor or the like.

Still further, the system 200 includes a relevant information retrieval component 238 for retrieving relevant information (e.g., dictionary definitions or links to additional information) that is associated with the relevant information selection keywords having the closest match (or matches) to the extracted and weighted relevant information selection keywords. The relevant information retrieval component 238 receives input from the information database 225 (in the form of an information keyword list(s)), as well as the output from the topic change detection and re-weighting component 226.

The system 200 additionally includes a relevant information display component 240 which displays the relevant information retrieved from the relevant information retrieval component 238 in association with the original online conversation content stream 210 on an appropriate viewing device 236 (e.g., a conventional computer monitor or the like).

The functions performed by each of these system components are more fully described below with regard to the method illustrated in FIGS. 3A and 3B.

Advertising content for display on an appropriate viewing device is selected, in accordance with embodiments of the present invention, such that revenue to the advertising content provider (i.e., the advertiser) is maximized. This is a non-trivial problem. On one hand, it is desirable to choose advertising content that the user is most interested in to increase the chance that she/he will click on the content and thereby access further information and/or complete a purchase. On the other hand, the advertising content providing the highest monetization value based on advertising keywords is desired. These two goals oftentimes conflict and achieving a balance between them provides for the most efficient advertising possible to occur.

The following probabilistic formula integrates and naturally balances these influence factors to yield maximal revenue in the statistical average and, thus, provides for the most efficient advertising possible. The goal is to choose the advertising content that maximizes the monetization value in the statistical sense (expected value). As in online conversations, user input is dynamic and incremental, at certain time intervals (e.g., every fifteen seconds) or sentence by sentence, one or a list of advertisements will be selected according to a probabilistic model that is designed to maximize the average (expected) monetization value. Mathematically, this can be represented by the following objective function:

$$(\hat{A}, \hat{W}) = \arg\max_{(A,W)} \{E_c(M^c(A,W) | V, U)\}$$

wherein A represents an advertisement, W represents an ad-word, V represents the content of the online conversation stream, U represents the user, C represents whether the user clicks through on the displayed advertisement or not, and $M^C$ represents the monetization value for the pair (A,W) if the advertisement is clicked-through (C=TRUE, click-through) or not (C=FALSE, impression).

This objective function can be expanded into the following:

$$E_C(M^C(A,W)|V,U) = E_{C,I,R_V,R_U,T}(M^C(A,W)|V,U)$$

$$= \Sigma_{C \in \{F\}, I \in \{F\}, R_V \in \{F\}, R_U \in \{F\}, T} M^C(A,W) \cdot P(C,I,R_V,R_U,T|A,W,V,U)$$

wherein I represents whether the user is interested in the content of the advertisement or not, $R_V$ represents whether the ad-word is relevant to the original on-line conversation stream, and $R_U$ represents whether the user has a historical interest in the ad-word.

The joint probability distribution shown above can be expanded into the following:

$$P(C,R_V,R_U|A,W,V,U) = P(C|I,A,U) \cdot P(I|R_V,R_U) \cdot P(R_U|W,U) \cdot P(R_V|W,V)$$

wherein each item represents information from a different source.

$P(R_V|W,V)$ represents the probability that the ad-word W is relevant to the online conversation V, and is provided by the keyword extraction component 224 of FIG. 2. Instead of a strict probability, common probabilistic relevance measures such as TF/IDF may be incorporated.

$P(R_U|W,U)$ represents the probability that the user has a general interest in the keyword (independent of the current interest). This information is available from the user profile 230 and/or user behavior 232 (FIG. 2), if available. It will be understood and appreciated by those of ordinary skill in the art that if no user profile and/or behavior information is available, this component may be removed from the joint probability distribution. All such variations are contemplated to be within the scope hereof.

$P(I|R_V,R_U)$ represents the probability that the user is interested in the content of the advertisement(s). The purpose of this is to integrate the user's historical interest ($R_V$) and the user's momentary interest (represented by the current online conversation, $R_U$).

$P(C|I,A,U)$ represents the probability that the user will click on an advertisement, taking into account whether she/he is/is not interested in the content of the advertisement. This information is available from the advertisements' click-through statistics (stored in the advertising database 224 of FIG. 2) and the user profile 230 and/or user behavior information 232 (FIG. 2). This reflects that even a user not interested in the content of an advertisement may click it (e.g., depending on how attractive an advertisement is designed), and that a user, despite being interested, may not necessarily click on the advertisement.

Figure 3A:
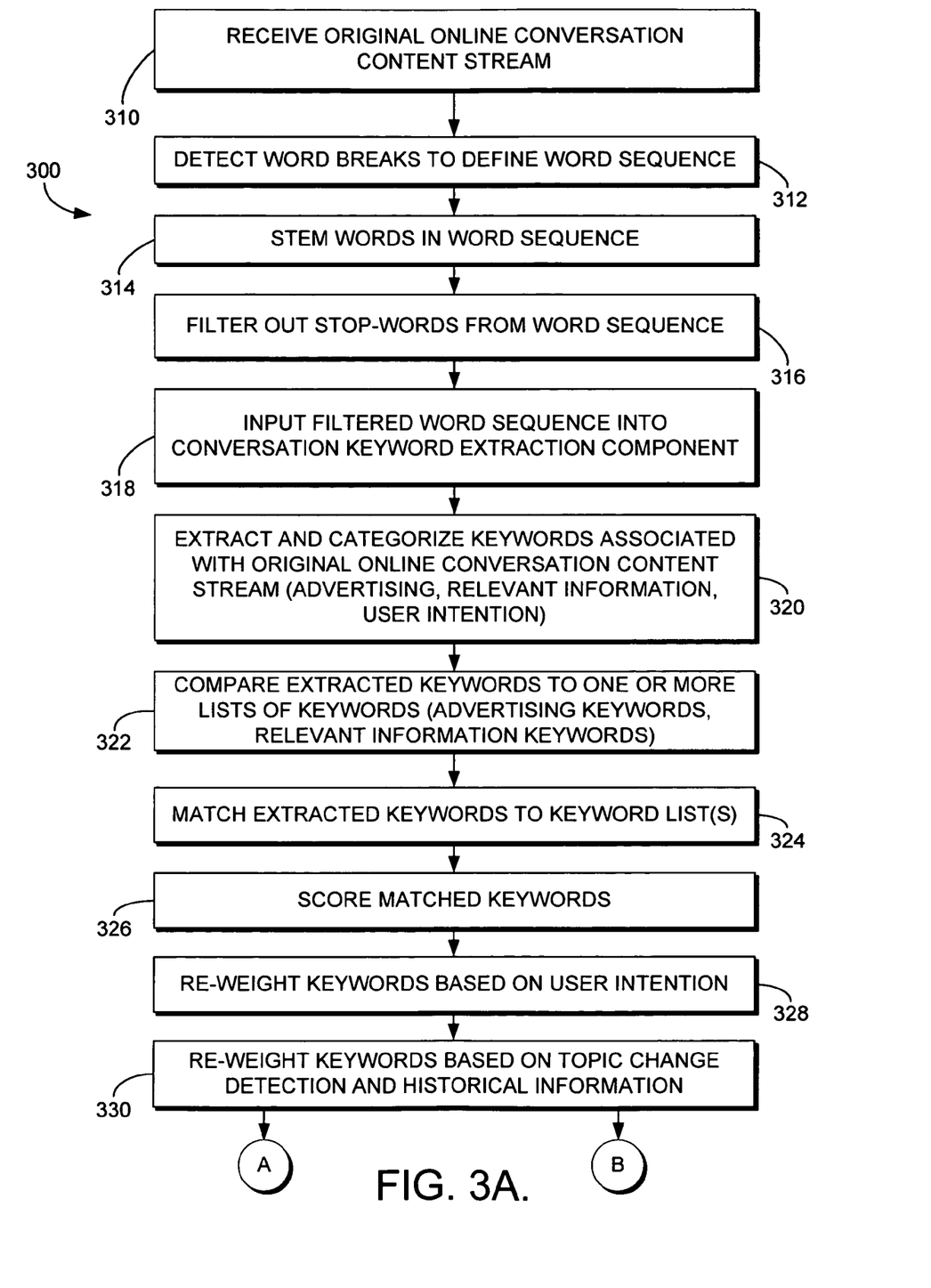
FIGS. 3A and 3B are a flow diagram illustrating a method for analyzing the content of online conversations (e.g., instant messaging sessions) using data mining technologies and utilizing the results of such analysis to retrieve relevant advertising content and/or other relevant information for display, in accordance with an embodiment of the present invention.
Figure 3B:
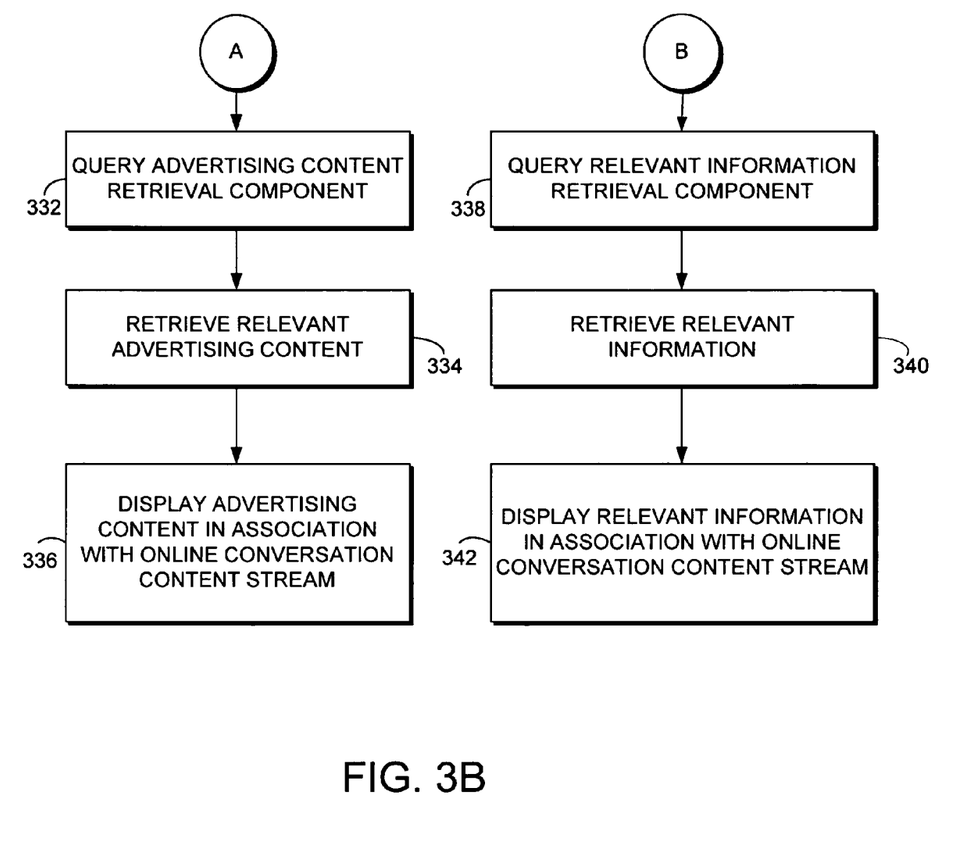

Turning now to FIGS. 3A and 3B, a method for analyzing the content of online conversations (e.g., instant messaging sessions) using data mining technologies and utilizing the results of such analysis to retrieve relevant advertising content and/or other relevant information for display in accordance with an embodiment of the present invention is illustrated and designated generally as reference numeral 300. Initially, as indicated at block 310, an original on-line conversation content stream is received and input into the system. Subsequently, breaks between words in the online conversation content stream are detected and utilized to define a word sequence, as indicated at block 312. Next, the word sequence is standardized, that is, the words are stemmed down to their respective root words. This is indicated at block 314. Subsequently, as indicated at block 316, stop-words, that is, words that are unimportant to the topic of the online conversation, are filtered out of the word sequence.

Subsequently, the filtered word sequence is input into the conversation keyword extraction component (218 of FIG. 2), as indicated at block 318. The keywords associated with the original online conversation content stream are then extracted and categorized as one or more of user intention keywords, advertising selection keywords, and/or relevant information selection keywords. This is indicated at block 320.

Next, the advertising keywords and useful information keywords are compared to one or more lists of keywords, as indicated at block 322. Referring back to FIG. 2, the advertising selection keywords are compared to one or more lists of advertising keywords stored in the advertising database 224 and the useful information selection keywords are compared to one or more information keywords lists stored in the information database 225.

The conversation keyword extraction component (218 of FIG. 2) not only extracts and categorizes keywords and compares the extracted keywords to the keyword lists, it also matches advertising keywords and relevant information keywords to the keywords associated with the original online conversation content stream (210 of FIG. 2). This is indicated at block 324. Keyword matching can be done by spelling or by pronunciation (phonetic matching). The keywords are subsequently given a score (i.e., a TF/IDF score), as indicated at block 326.

Subsequently, the keywords are re-weighted based upon user intention, as indicated at block 328. Simultaneously or sequentially, the keywords are re-weighted based upon detected changes in topic and historical information, as indicated at block 330. This is to accommodate for the fact that the original online conversation content stream (210 of FIG. 2) may contain multiple topics.

As in online conversations, user input is dynamic and incremental, to maintain continued relevance of the advertising content and/or other relevant information being displayed, advertising content and other relevant information are updated at a regular rate. Thus, the keyword extraction component preferably extracts keywords periodically, e.g., every fifteen seconds or sentence by sentence, rather than waiting until the end of a topic. Thus, compared to conventional keyword-extraction methods, the methods of the present invention utilize a "history feature" wherein keywords extracted from the previous input segments are utilized to aid extraction of the current input segment. Topic change detection and keyword re-weighting based thereon are more fully described below with reference to FIG. 4.

Figure 4:
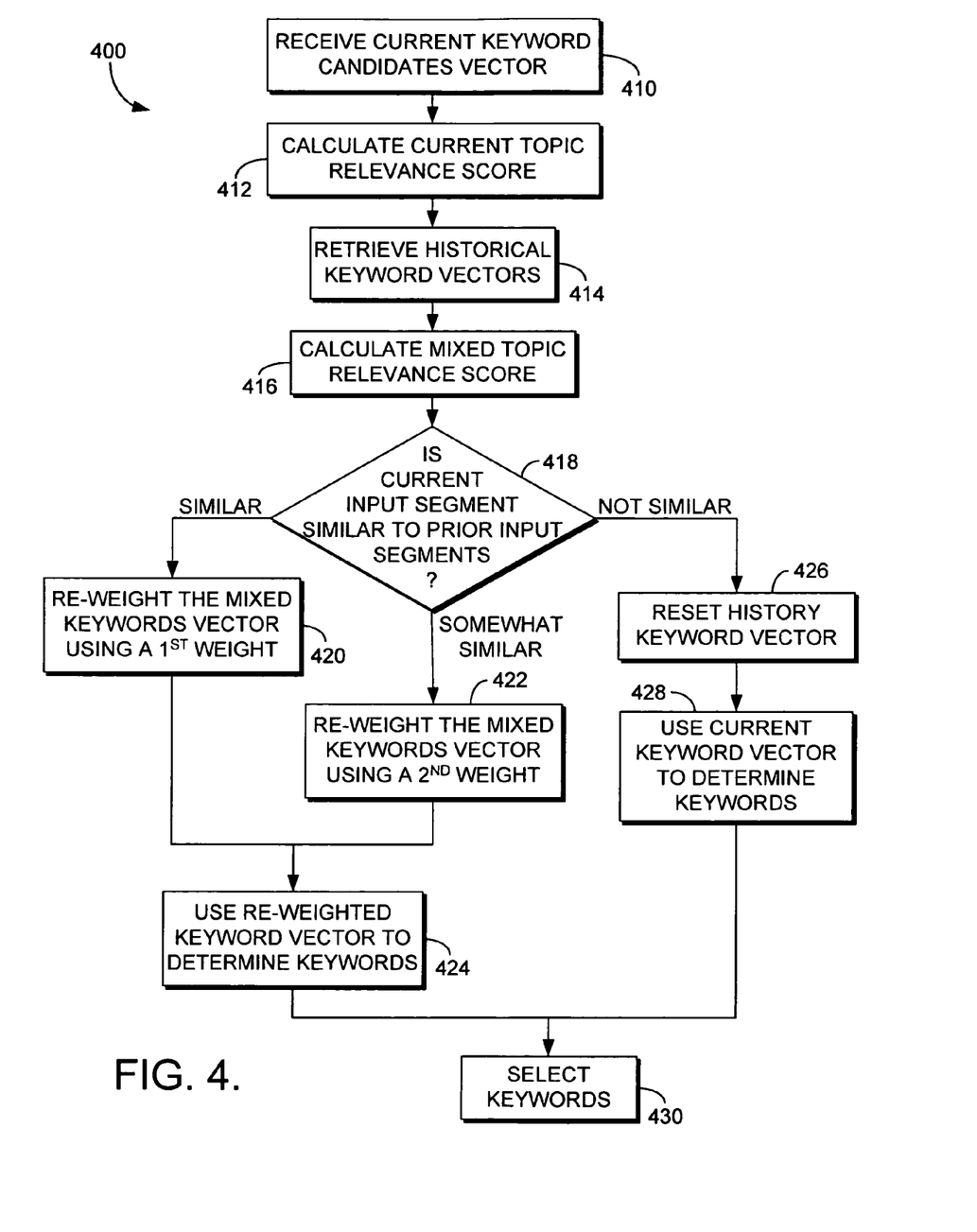
FIG. 4 is a flow diagram illustrating a method for re-weighting keywords based on historical information and topic change detection in accordance with an embodiment of the present invention.

Turning to FIG. 4, a method for topic change detection and keyword re-weighting is illustrated and designated generally as reference numeral 400. Initially, as indicated at block 410, current keyword candidates vector is received and a current topic relevance score is calculated, as indicated at block 412. To accomplish this, historical information is utilized to detect topic changes. Keyword vectors are generated and stored for several prior input segments, e.g., prior four input segments, in an online conversation stream. Subsequently, these historical keyword vectors are retrieved, as indicated at block 414, and added to the current keyword candidates vector. Subsequently, a mixed topic relevance score between the current input segment and the earlier input segments may be calculated, as indicated at block 416.

Subsequently, it is determined if the current input segment is similar to the prior input segments. This is indicated at block 418. If the mixed topic relevance score between the current input segment and the prior input segments is larger than a first threshold $a_1$, e.g., 0.0004, the current input segment may be regarded as similar to the earlier input. In this scenario, the history keyword vectors are aged with the current keyword candidate vector using a first weight $w_1$, such as 0.9. This is indicated at block 420. The mixed, re-weighted keyword vectors are subsequently used for keyword selection and advertisement and/or other relevant information retrieval, as indicated at block 424 and as more fully described below.

If the mixed topic relevance score between the current input segment and the prior input segments is less than the first threshold $a_1$, but larger than a second threshold $a_2$ ($a_1 < a_2$), e.g., 0.0001, the current input segment may be regarded as somewhat similar to the earlier input segment. In this scenario, the history keyword vectors are aged with the current keyword candidate vector using a second weight $w_2$ ($w_2 < w_1$), e.g., 0.5. This is indicated at block 422. The mixed keyword vectors are subsequently used for keyword selection and advertising content and/or other relevant information retrieval, as indicated at block 424 and as more fully described below.

If the mixed topic relevant score is less than the second threshold $a_2$, the current input segment is regarded as not similar to the earlier input segment, and the history keyword vector may be reset, as indicated at block 426. In this scenario, the current keyword vector subsequently may be used for keyword selection and advertising content and/or other relevant information retrieval, as indicated at block 428 and as more fully described below.

Subsequently, based upon the current or re-weighted keyword vectors, whichever is appropriate, keywords may be selected for utilization in advertising content and/or other relevant information retrieval, as more fully described below. This is indicated at block 430.

With reference back to FIG. 3B, the re-weighted or current keyword vector, whichever is appropriate, is subsequently used to generate the query of the advertising content retrieval component (228 of FIG. 2). This is indicated at block 332.

It may be desirable to simplify the form of the modified content descriptor, e.g., to enable reuse of existing advertising content retrieval components designed for paid-search (with the input being queries input by search-engine users), or to better integrate with ranking functions of existing components. Three forms of modified content descriptors that differ in their level of detail and simplification are discussed below.

First, a modified content descriptor may include multiple scored keywords. With this representation, the optimization criteria discussed hereinabove may be fully implemented. However, conventional advertising content retrieval components need to be (re-)designed to not only accept multiple keyword hypotheses but also incorporate the probabilities correctly into their existing ranking formulas. In this representation, a set of ad-words $W_{BEST}$ and a score $P(R_V | W, U, V)$ for each W in the set is available. The optimal advertising content is described by the following formula:

$$(\hat{A}, \hat{W}) = \arg\max_{(A, W): W \in BEST} \{E_c(M^c(A, W) | V, U)\}$$

$$= \arg\max_{(A, W): W \in WBEST} \left\{\sum_{C, I, R_V, R_U} M^c(A, W) \cdot P(C, I, R_V, R_U | A, W, V, U)\right\}$$

$$= \arg\max_{(A, W): W \in WBEST} \left\{\sum_{C, I, R_V, R_U} M^c(A, W) \cdot P(C, I, V, U) = P(I | R_V R_U) \cdot P(R_V | W, U, V) \cdot P(R_U | W, U)\right\}$$

Secondly, a modified content descriptor may include multiple keywords without scores. In this slightly simplified form, a hard decision is made in the keyword extraction and topic change detection stages about which advertising keywords are relevant to the online conversation stream by choosing the top-ranking ones according to $P(R_r|W,U,V)$ and then quantizing $P(R_r|W,U,V)$ to 1.0. The detailed interplay with the probability terms processed inside the advertising content retrieval component (228 of FIG. 2) is disregarded, thus leading to less optimal monetization value than when multiple keywords are provided with scores.

In a third approach, a modified content descriptor may include only the best keyword. In this further simplified form, only one keyword is provided. This form is generally compatible with conventional advertising content retrieval components designed for paid-search applications, but this way will not lead to optimal average monetization value.

Each of the above-described modified content descriptors, or any combination thereof, may be utilized for the methods described herein and all such variations are contemplated to be within the scope of the present invention.

With continued reference to FIG. 3, relevant advertising content is subsequently selected and retrieved based upon the modified content descriptors, as indicated at block 334. Subsequently, as indicated at block 336, the retrieved advertising content is displayed in association with the online conversation content stream (210 of FIG. 2).

Simultaneously or sequentially with respect to querying the advertising content retrieval component (228 of FIG. 2), the useful information retrieval component (238 of FIG. 2) is also queried, as indicated at block 338. Subsequently, useful information (e.g., dictionary definitions, links to additional information related to the keywords, or the like) is retrieved from the information database (225 of FIG. 2), as indicated at block 340. Next, the useful information is displayed in association with the online conversation stream, as indicated at block 342. As displaying the definition of common words is not very helpful to the user, these words are preferably filtered out before query is made to the useful information retrieval component. Further, words in which the first part-of-speech attribute is not a noun are preferably also filtered out prior to querying. In one embodiment, the retrieved information may be displayed at the right side of the online conversation window. This embodiment is illustrated with reference to FIG. 5.

Figure 5:
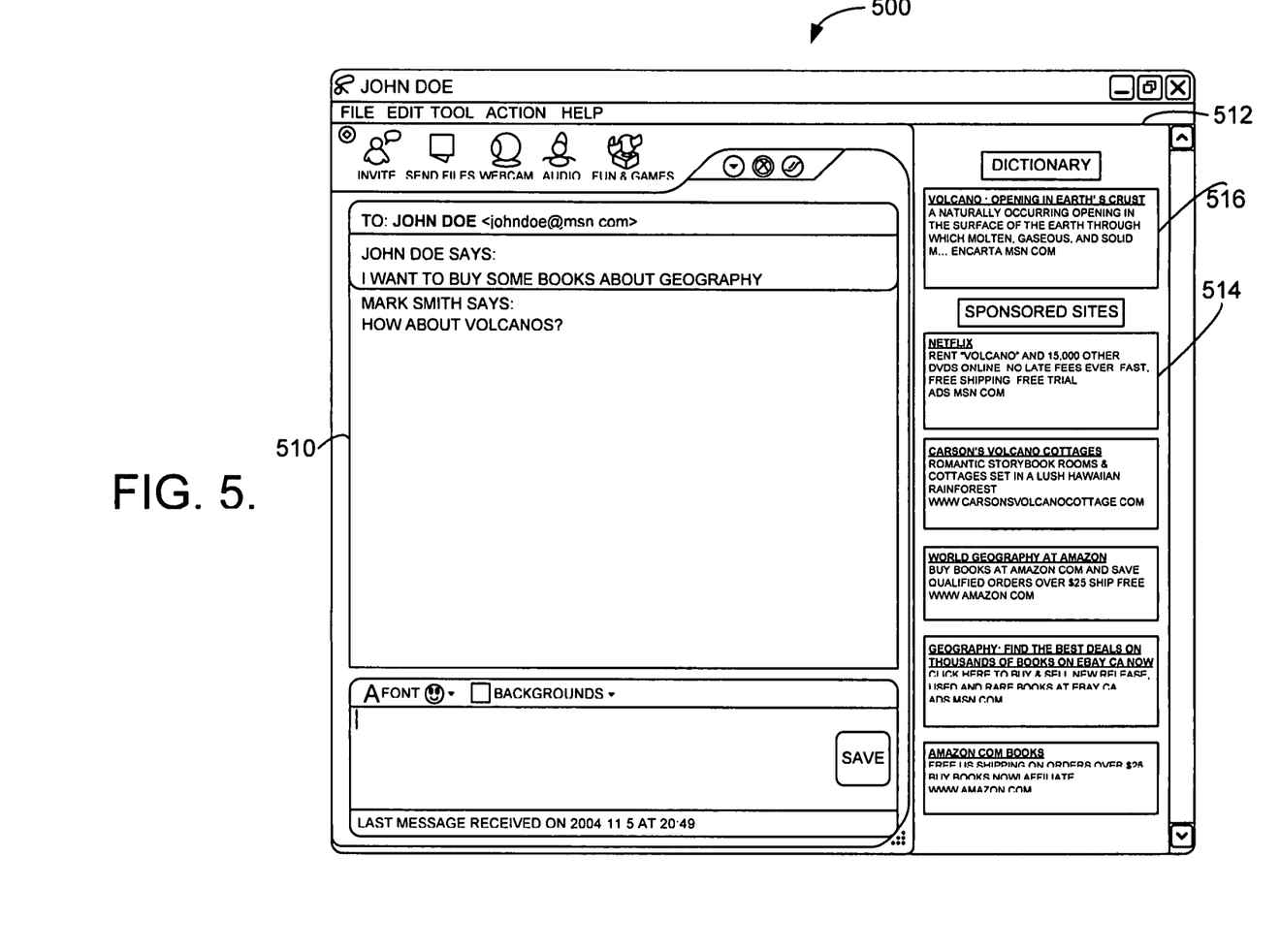
FIG. 5 is an illustrative screen shot of a user interface for displaying advertising content and/or other information relevant to the content of an online conversation in association with such content in accordance with an embodiment of the present invention.

FIG. 5 is an illustrative screen shot of a user interface for displaying advertising content and/or other information relevant to the content of an online conversation in association with such content in accordance with an embodiment of the present invention, the user interface being designated generally as reference numeral 500. The user interface 500 includes an online conversation window 510 wherein the content of an online conversation between John Doe and Mark Smith is being displayed. The user interface 500 further includes a retrieved content display area 512 at the right side of the online conversation window 510. The retrieved content display area 512 includes a relevant information display portion 516 wherein a dictionary definition of the word "volcano" is being displayed in response to Mark Smith's utilization of the word "volcano" in the online conversation. The retrieved content area 512 further includes an advertising content display portion 514 wherein a number of advertisements related to volcanoes and/or geography in general are being displayed. Thus, all information displayed in the retrieved content area 512 is served in response to the content of the online conversation between John Doe and Mark Smith.

It will be understood and appreciated by those of ordinary skill in the art that the user interface 500 illustrated is shown by way of example only and that any user interface wherein advertising content and/or other relevant information served in response to the content of an online conversation may be utilized and is contemplated to be within the scope of the present invention. For instance, in addition to being displayed to the right of the online conversation window, the retrieved content may be displayed to the left side of the online conversation window, below the online conversation window, or any combination thereof.

As can be understood, the present invention uses data mining technology to extract and summarize the content of online conversational content and permits the retrieval and display of relevant advertising content and/or useful information according to the extracted content in real-time. That is, the invention matches the content of online conversations to the context of advertisements and/or useful information. The content of the online conversations is generated by text mining technology. The content of advertisements is generated either the same way or through keywords/content provided by the advertiser. It can be applied to the text of any online conversation, e.g., instant messaging sessions.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for utilizing content of an online conversation to select advertising content for display, the method comprising:

receiving, via a computing device, the content of the online conversation, wherein the online conversation comprises an instant messaging session;

extracting one or more keywords from the content of the online conversation;

characterizing the one or more keywords that are extracted from the content of the online conversation as one or more of an advertising selection keyword and a user-intention keyword, wherein an advertising selection keyword includes a keyword that matches a word on an advertising-keyword list, and wherein a user-intention keyword indicates user interest in a topic and includes a keyword that is proximate to one or more of a trigger word and a trigger phrase, which are identified in a pre-defined list;

scoring a keyword that has been characterized as an advertising selection keyword, wherein scoring comprises calculating a measure of frequency of the advertising selection keyword;

determining that the advertising selection keyword, which has been scored, has also been characterized as a user-intention keyword;

re-weighting the advertising selection keyword, which has also been characterized as a user-intention keyword, to be given greater weight in a joint-probability-distribution algorithm that is usable to select advertising content;

selecting the advertising content to be displayed based on the joint-probability-distribution algorithm, which includes the advertising selection keyword that has been both scored and re-weighted; and outputting in association with the content the advertising content that is selected.

2. The method of claim 1, further comprising displaying the advertising content selected in association with the content of the online conversation.

3. The method of claim 1, further comprising receiving one or more of a user profile and information regarding user behavior, wherein selecting the advertising content to be displayed comprises selecting the advertising content to be displayed based upon at least one of the one or more extracted keywords, the user profile, the information regarding user behavior, an historic click-through rate, and a monetization value.

4. The method of claim 1, wherein the joint-probability-distribution algorithm is represented by:

$$P(C,I,R_V,R_U|A,W,V,U)=P(C|I,A,U).P(I|R_V,R_U).\\P(R_U|W,U).P(R_V|W,V)$$

wherein $P(R_V|W,V)$ represents a probability that an adword W is relevant to the online conversation V and is based on the advertising selection keyword that has been re-weighted;

wherein $P(R_U|W,V)$ represents a probability that a user has a general interest in the advertising selection keyword and is based on one or more of a user profile and historical user behavior; and wherein $P(I|R_V,R_U)$ represents a probability that the user is interested in the advertising content and is based on one or more of a historical interest ($R_V$) of the user and a momentary interest of the user ($R_U$).

5. The method of claim 1, further comprising:
retrieving historical-keyword information;
calculating a mixed topic relevance score between the advertising selection keyword and the historical-keyword information; and
comparing the mixed topic relevance score to a threshold value to determine that a topic change has occurred.

6. The method of claim 5, further comprising re-weighting the advertising selection keyword based upon historical data.

7. One or more computer-readable storage media having computer-executable instructions for performing a method for utilizing content of an online conversation to select advertising content for display, the method comprising:
receiving the content of the online conversation, wherein the online conversation comprises an instant messaging session;
extracting a keyword from the content of the online conversation, wherein the keyword is an advertising selection keyword that matches a word on an advertising-keyword list;
scoring the advertising selection keyword tat has been extracted by calculating a measure of frequency;
determining that the advertising selection keyword includes a user intention keyword;
re-weighting the advertising selection keyword to be given greater weight in a joint-probability-distribution algorithm that is usable to select advertising content;
selecting the advertising content to be presented based upon the keyword that has been scored and re-weighted; and
displaying the advertising content in association with the content of the online conversation.

8. The method of claim 7, further comprising receiving one or more of a user profile and information regarding user behavior, wherein selecting the relevant information for display comprises selecting the relevant information for display based upon at least one of the keyword, the user profile, and the information regarding user behavior.

9. The method of claim 7, further comprising comparing the keyword to one or more relevant-information selection keywords, wherein selecting the relevant information for display comprises selecting the relevant information for display based upon the comparison of the keyword to the one or more relevant-information selection keywords.

10. The method of claim 7, further comprising determining whether a topic change has occurred.

11. The method of claim 10, wherein if it is determined that a topic change has occurred, the method further comprises re-weighting the one or more scored keywords based upon historical data.

12. One or more computer-readable storage media having computer-executable instructions for performing a method for utilizing content of an online conversation to select advertising content to be displayed, the method comprising:
receiving current content of an online conversation, wherein the online conversation comprises an instant messaging session;
extracting one or more keywords from the current content of the online conversation;
retrieving historical-keyword information of the online conversation, the historical-keyword information being provided by a user prior to the current content;
calculating a mixed topic relevance score between the one or more keywords from the current content and the historical-keyword information, wherein the mixed topic relevance score is usable to detect a change in a topic between the current content and the historical-keyword information;
determining whether the mixed topic relevance score is either above or below a threshold value,
wherein if the mixed topic relevance score is above the threshold value, no change is deemed to have occurred and both the one or more keywords from the current content and the historical-keyword information are used to select at least one of advertising content and other relevant information, and
wherein if the mixed topic relevance score is below the threshold value, a change is deemed to have occurred and the one or more keywords from the current content are used to select at least one of advertising content and other relevant information and the historical-keyword information is not used;
characterizing a keyword of the one or more keywords from the current content as an advertising selection keyword, which includes a keyword that matches a word on an advertising-keyword list;
scoring the keyword that has been characterized as an advertising selection keyword, wherein scoring comprises calculating a measure of frequency of the advertising selection keyword;
determining that the advertising selection keyword, which has been scored, has also been characterized as a user-intention keyword;
re-weighting the advertising selection keyword, which has also been characterized as a user-intention keyword, to be given greater weight in a joint-probability-distribution algorithm that is usable to select advertising content;
selecting the advertising content to be displayed based which includes the advertising selection keyword that has been both scored and re-weighted; and
retrieving the advertising content to be displayed based on the joint-probability-distribution algorithm; and
displaying advertising content that was retrieved.

* * * * *

UNITED STATES PATENT AND TRADEMARK OFFICE
CERTIFICATE OF CORRECTION

PATENT NO.      : 7,653,627 B2                                          Page 1 of 1
APPLICATION NO. : 11/128788
DATED           : January 26, 2010
INVENTOR(S)     : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Twenty-third Day of November, 2010

David J. Kappos
*Director of the United States Patent and Trademark Office*